US012240514B2

United States Patent
Achermann et al.

(10) Patent No.: US 12,240,514 B2
(45) Date of Patent: Mar. 4, 2025

(54) MOBILE TRANSPORT DEVICE AND METHOD FOR INTRODUCING AN INSTALLATION FRAME INTO A SHAFT

(71) Applicant: Inventio AG, Hergiswil (CH)

(72) Inventors: Guido Achermann, Neuenkirch (CH); Roger Beck, Sursee (CH); Gabriele Bizzozero, Gisikon (CH); Dragan Gavric, Brunnen (CH); Ralph Harmath, Emmenbrücke (CH); Nico Langhi, Hausen am Albis (CH); Stefan Weber, Niederwil (CH); Andre Weibel, Ballwil (CH)

(73) Assignee: INVENTIO AG, Hergiswil (CH)

( * ) Notice: Subject to any disclaimer, the term of this patent is extended or adjusted under 35 U.S.C. 154(b) by 322 days.

(21) Appl. No.: 17/758,637

(22) PCT Filed: Jan. 4, 2021

(86) PCT No.: PCT/EP2021/050011
§ 371 (c)(1),
(2) Date: Jul. 12, 2022

(87) PCT Pub. No.: WO2021/144154
PCT Pub. Date: Jul. 22, 2021

(65) Prior Publication Data
US 2023/0049422 A1 Feb. 16, 2023

(30) Foreign Application Priority Data
Jan. 17, 2020 (EP) .................... 20152328

(51) Int. Cl.
*B62B 3/02* (2006.01)
*B62B 5/00* (2006.01)
*B66B 19/00* (2006.01)

(52) U.S. Cl.
CPC .............. *B62B 3/02* (2013.01); *B62B 5/0026* (2013.01); *B62B 2203/073* (2013.01); *B66B 19/00* (2013.01)

(58) Field of Classification Search
CPC ... B62B 3/02; B62B 5/0026; B62B 2203/073; B62B 3/022; B62B 3/04; B62B 2203/07;
(Continued)

(56) References Cited

U.S. PATENT DOCUMENTS

2018/0208438 A1    7/2018   Cambruzzi et al.

FOREIGN PATENT DOCUMENTS

| CN | 208884966 U | 5/2019 |
| CN | 110461755 A | 11/2019 |

(Continued)

*Primary Examiner* — James A Shriver, II
*Assistant Examiner* — Nicholas R. Kandas
(74) *Attorney, Agent, or Firm* — William J. Clemens; Shumaker, Loop & Kendrick, LLP

(57) ABSTRACT

A mobile transport device and a method for introducing an installation frame into a shaft, in particular an elevator shaft, are used for transporting an installation frame and for introducing the installation frame into the shaft. The installation frame has a base frame and a bearing frame on which the installation frame is supported from above. The transport device additionally has a fixing device arranged on the base frame for fixing the base frame to a shaft opening of a shaft wall of the shaft and for preventing the transport device from tilting. The bearing frame is supported by the base frame and is movable in the horizontal direction relative to the base frame such that, when the base frame is arranged outside of the shaft, the bearing frame, and thus also the installation frame, can be moved into the shaft from outside the shaft through the shaft opening.

14 Claims, 3 Drawing Sheets

(58) Field of Classification Search
CPC ....... B66B 19/00; B66B 19/002; B66B 20/00; B66B 1/466
See application file for complete search history.

(56) References Cited

FOREIGN PATENT DOCUMENTS

| | | | |
|---|---|---|---|
| EP | 1710146 | A2 | 11/2006 |
| EP | 1717186 | A1 | 11/2006 |
| JP | H0356501 | A | 3/1991 |
| JP | H0577195 | A | 3/1993 |
| JP | H05330758 | A * | 12/1993 |
| JP | H101268 | A * | 1/1998 |
| JP | H1179599 | A | 3/1999 |
| JP | 2001278057 | A | 10/2001 |
| JP | 2004010175 | A | 1/2004 |
| JP | 2016160091 | A | 9/2016 |
| WO | 2017016780 | A1 | 2/2017 |
| WO | 2017016783 | A1 | 2/2017 |

* cited by examiner

MOBILE TRANSPORT DEVICE AND METHOD FOR INTRODUCING AN INSTALLATION FRAME INTO A SHAFT

FIELD

The invention relates to a mobile transport device for transporting an installation frame and for introducing the installation frame into a shaft, in particular an elevator shaft, and to a method for introducing the installation frame into a shaft, in particular an elevator shaft.

BACKGROUND

JP 2016 160091 A describes a mobile transport device for transporting an installation frame and for introducing the installation frame into an elevator shaft. The transport device has a base frame and a fixing device arranged on the base frame for fixing the base frame to a shaft opening and for preventing the transport device from tilting.

WO 2017/016783 A1 describes an installation device with a mechatronic installation component that is arranged on an installation frame. The installation device is used to carry out automated installation steps, for example drilling holes in shaft walls of an elevator shaft as part of the installation of an elevator in the elevator shaft. In order to be able to carry out installation steps at different heights in the elevator shaft, the installation device is suspended from a flexible suspension means, so that it can be displaced in the elevator shaft by a displacement component arranged at the top of the elevator shaft by means of the suspension means. Before the installation device can carry out installation steps in the elevator shaft, the installation device must be transported to the elevator shaft and introduced into the elevator shaft via a shaft opening. WO 2017/016783 A1 does not go into how the installation device is to be transported and introduced into the elevator shaft.

Transporting and introducing the installation device into the shaft and thus also the installation frame is quite complex due to the necessary dimensions of the installation device and the weight thereof. A further complication is that the elevator shaft at the shaft opening through which the installation device is to be introduced usually has neither a solid floor nor a temporary installation platform onto which the installation device can be placed and onto which an installer could step.

SUMMARY

It is therefore an object of the invention in particular to propose a mobile transport device and a method for introducing the installation frame into a shaft, in particular an elevator shaft, which transport device allows the installation frame to be easily and in particular safely introduced into the shaft. According to the invention, this object is achieved by a mobile transport device having the features described below.

The mobile transport device according to the invention for transporting an installation frame and for introducing the installation frame into a shaft, in particular an elevator shaft, has a base frame and a bearing frame on which the installation frame can be supported from above. The transport device also has a fixing device arranged on the base frame for fixing the base frame to a shaft opening of a shaft wall of the shaft and for preventing the transport device from tilting. The bearing frame is supported by the base frame and is movably arranged in the horizontal direction relative to the base frame such that, when the base frame is arranged outside of the shaft, the bearing frame and thus also the installation frame can be moved into the shaft from outside the shaft through the shaft opening.

The mobile transport device, including the installation frame, can thus be brought or displaced to the shaft opening and fixed to the shaft opening outside of the shaft by means of the fixing device. The bearing frame can subsequently be moved horizontally together with the installation frame relative to the base frame and thus pushed through the shaft opening into the shaft. The bearing frame and the installation frame are also supported by the base frame during the horizontal movement, so that the installation frame does not have to be additionally held or supported. In particular, the installation frame can also be arranged on the bearing frame in such a way that it is not necessary to rotate or tilt the installation frame before or during introduction into the shaft. The horizontal movement of the bearing frame and the installation frame requires comparatively little force, since only the friction between the base frame and the installation frame has to be overcome. The installation frame can thus be introduced into the shaft very easily. It is also not necessary for an installer to go into the elevator shaft or directly into the shaft opening when introducing the installation frame. Introducing the installation frame is thus also particularly safe.

The embodiments described below relate equally to the mobile transport device and to the method. In other words, features mentioned below for example with reference to the mobile transport device can also be implemented as method steps, and vice versa.

The transport device is designed as a mobile transport device. This is to be understood as meaning that the transport device as a whole, including an installation frame fitted on the bearing frame, is mobile, i.e. can be displaced. The transport device can, for example, have rollers on which it can be moved. It is also possible that the transport device is displaced with a forklift, for example. In addition, the transport device can also be suspended from a cable and lifted and displaced, for example, by a crane.

The installation frame can be used to hold a mechatronic installation component, for example in the form of an industrial robot. Using the mechatronic installation component, automated installation steps can be carried out in the shaft when the installation frame is in the fixed state. The mechatronic installation component can, for example, be designed according to the automated installation component of WO 2017/016780 A1. However, the installation frame can, for example, also carry an installation platform or be designed as an installation platform from which an installer can carry out installation steps by hand or with the help of tools in the shaft.

A shaft is to be understood in this case as an elongate space delimited by shaft walls. In particular, the shaft has a mainly rectangular cross section, although other cross sections are also conceivable. In particular, the shaft runs in a mainly vertical direction. The shaft is arranged in particular in a building, although it can also be arranged in a bridge, a pillar, or on a ship, for example. The shaft walls consist in particular of concrete strengthened with reinforcements. However, they can also be made of metal, for example. The shaft is used in particular as an elevator shaft of an elevator installation, in which, during operation of the elevator installation, a car for transporting people and/or objects is displaced in the displacement direction. The shaft can also serve other purposes; for example it can be used as a ventilation shaft or to house pipes, electric cables, or the like.

The shaft has a shaft opening through which the shaft is accessible from the side, i.e. in the horizontal direction. The shaft opening is thus arranged in one of the shaft walls of the shaft. If the shaft is designed as an elevator shaft, a shaft door is installed in the shaft opening during installation of an elevator in the elevator shaft, through which shaft door passengers can enter and exit a car of the elevator during subsequent operation of the elevator. In front of the shaft opening, i.e. outside the shaft, a floor is arranged in particular, on which floor the transport device can stand. If the shaft is designed as an elevator shaft, the floor is the floor of the story that is accessible via the corresponding shaft opening and thus shaft door.

After introduction into the shaft, the installation frame should be able to be displaced within the shaft in the displacement direction and thus be positioned at different locations, in particular at different heights within the shaft. For this purpose, before or after introduction into the shaft, the installation frame is connected to a displacement component, in particular in the form of a winch, with a suspension means, for example in the form of a cable, a chain, or a belt. The suspension means can be wound up or down by the winch, and the installation frame can thus be displaced in the shaft. After introduction into the shaft, the installation frame can thus be lifted upward from the bearing frame.

In particular, the base frame has a mainly cuboid basic shape. A basic structure of the base frame is made up in particular of metal profiles which in particular have a rectangular cross section. Further components can be arranged on the basic structure.

In particular, the bearing frame also has a mainly cuboid basic shape and thus a mainly rectangular cross section. In particular, the bearing frame is not as high as the base frame. The bearing frame thus forms an upwardly oriented support surface on which the installation frame can be fitted, so that the installation frame is supported from above on the bearing surface and thus on the bearing frame. The bearing frame consists, for example, mainly of rectangular metal profiles that are welded together. The bearing frame is carried by the base frame so that it is supported on the base frame from above. In particular, it is supported exclusively on the base frame.

With the fixing device arranged on the base frame, the base frame and thus the transport device can be fixed outside the shaft at the shaft opening. Fixation to the shaft opening should be understood to mean that the fixing device is supported on the parts of the shaft forming the shaft opening in such a way that it can support forces in the horizontal direction, in particular perpendicular to the shaft opening, and torques that could result in the transport device tilting. The parts of the shaft that form the shaft opening are to be understood in particular as meaning the shaft wall (inside the shaft and outside the shaft), but also a floor or a ceiling in front of the shaft opening.

In order to introduce the installation frame into the shaft, i.e. to bring it into the shaft from outside the shaft, the transport device including the installation frame is arranged at a suitable position in front of the shaft opening, i.e. outside the shaft. The base frame and thus the transport device are subsequently fixed to the shaft opening by means of the fixing device. The bearing frame can subsequently be moved in the horizontal direction in the direction of the shaft relative to the base frame, so that the bearing frame and thus the installation frame are moved through the shaft opening into the shaft. For example, the bearing frame can be moved between 150 and 200 cm relative to the base frame. The movement cannot run exclusively in the horizontal direction but can also have a vertical component. It can therefore also run obliquely or inclined.

Before the movement of the bearing frame relative to the base frame, the bearing frame is mainly, in particular completely, arranged above the base frame. A force resulting from the weight of the bearing frame and an installation frame fitted on the bearing frame thus acts within the base frame. The movement of the bearing frame in the direction of the shaft causes the bearing frame to protrude beyond the base frame in the horizontal direction, and the effective direction of the resulting force mentioned is also moved horizontally in the direction of the shaft. Ultimately, this means that the resulting force acts outside the base frame, which results in a tilting moment on the base frame. This tilting moment is supported by the fixing device, and the base frame and thus the transport device are prevented from tilting. It is therefore not sufficient if the base frame is only secured against horizontal movement.

The transport device can also be used to remove the installation frame from the shaft. For this purpose, the transport device is arranged and fixed at the shaft opening in the same way as for introducing the installation frame into the shaft. The bearing frame is subsequently moved through the shaft opening into the shaft without a fitted installation frame. The installation frame having the displacement component can subsequently be fitted on the bearing frame. The bearing frame is subsequently moved horizontally out of the shaft in the direction of the base frame and thus from inside the shaft to outside the shaft. The installation frame can be detached from the suspension means either inside or outside the shaft.

In an embodiment of the invention, the bearing frame is arranged on the base frame via a telescopic extension rail, in particular two telescopic extension rails arranged parallel next to one another. This allows for a particularly simple construction of the transport device. In addition, the use of telescopic extension rails allows an easy horizontal displacement of the bearing frame relative to the base frame with ease, and thus a particularly easy introduction of the installation platform into the shaft. Since the bearing frame having the fitted installation frame is quite heavy, the telescopic extension rails used are designed as so-called heavy-duty telescopic extension rails.

A telescopic extension rail consists of at least two guide rails, the profiles of which run into one another and can be moved against one another. A first guide rail, in particular an outer guide rail, is connected to the base frame, and a second guide rail, in particular an inner guide rail, is connected to the bearing frame. The guide rails can, for example, be connected, in particular screwed, directly or via an intermediate bracket to the base frame or the bearing frame.

In an embodiment of the invention, the base frame and the bearing frame each have a stop which is designed and arranged in such a way that they delimit a movement of the bearing frame relative to the base frame. They can also each have more than one stop, in particular two stops. It can thus be reliably prevented that the bearing frame is moved too far relative to the base frame and it can no longer be held by the base frame. This ensures a particularly safe transport device.

The stops of the base frame and bearing frame come into contact with each other when a maximum horizontal movement of the bearing frame relative to the base frame is reached and thus prevent further movement. The stops can be designed, for example, as small metal plates that can be welded or screwed to the base frame or the bearing frame.

In an embodiment of the invention, the bearing frame can be moved relative to the base frame by means of a spindle drive. This allows a particularly simple movement of the bearing frame relative to the base frame and thus a particularly simple introduction of the installation frame into the shaft. The spindle drive can be actuated by hand, for example, by means of a crank. It is also possible for a spindle of the spindle drive to be able to be coupled to a hand drill and for the spindle drive to be actuated by means of a coupled hand drill. In addition, it is possible that a drive, for example an electric motor for actuating the spindle drive, is arranged permanently on the transport device.

The spindle of the spindle drive is in particular rotatably and non-movably mounted in the horizontal direction on the base frame and is connected at one end to the bearing frame in such a way that the bearing frame is horizontally moved relative to the spindle when the spindle rotates. When the spindle rotates, the bearing frame is moved relative to the base frame.

In an embodiment of the invention, the bearing frame is arranged inclined relative to the horizontal. The inclination is given when the transport frame is standing on a floor that runs at least almost horizontally. The bearing frame is in particular arranged inclined in such a way that, when the transport device is arranged at a shaft opening of the shaft, it has a gradient in the direction of the shaft opening and thus in the direction of the shaft. This means that, when introducing the installation frame into the shaft, the bearing frame and installation frame can be moved automatically relative to the base frame through the shaft opening and into the shaft due to its weight without the need for any further application of force. This makes the introduction of the installation frame into the shaft particularly easy.

The inclination can, for example, be between 5 and 15°, in particular approximately 10°. In particular, a cable winch is arranged on the base frame, by means of which cable winch the bearing frame can be pulled out of the shaft in the direction of the base frame again. For this purpose, the cable of the cable winch is connected to the bearing frame. By means of the cable winch and the cable, the automatic movement of the bearing frame relative to the base frame when introducing the installation frame into the shaft can also be controlled, i.e. the automatic movement can be braked or prevented. In addition to the cable winch, a securing mechanism of the bearing frame relative to the base frame can be provided, which securing mechanism prevents the bearing frame from being unintentionally moved relative to the base frame. The securing mechanism can have a bolt, for example, which bolt is inserted into corresponding recesses in the bearing frame and base frame.

If the transport device has a spindle drive as described above, the bearing frame is in particular arranged horizontally, i.e. not inclined. However, a combination of a spindle drive and an inclined arrangement of the bearing frame is also conceivable.

In an embodiment of the invention, the fixing device has a primary fixing element for support on an outside of the shaft wall having the shaft opening. A particularly secure fixation can thus be made possible and tilting of the transport device when moving the bearing frame relative to the base frame can be prevented in a particularly reliable manner.

The outside of a shaft wall is to be understood in this case as that shaft wall side which is oriented outward as seen from the shaft. Accordingly, an inside of a shaft wall is to be understood here as that shaft wall side which is oriented inward as seen from the shaft.

The fixing device has, in particular, two primary fixing elements which are each arranged laterally on the base frame with respect to the shaft opening. During fixing, the primary fixing element or the primary fixing elements extend so far upward, in particular in the vertical direction, that they protrude beyond the door opening and can thus be supported above the door opening on the outside of the shaft wall. When moving the bearing frame into the shaft, there is in particular a risk that the base frame and thus the transport device will tilt in the direction of the shaft. This can be reliably prevented with a support on the outside of the shaft wall having the shaft opening above the shaft opening.

The primary fixing element has, in particular, a spindle which, during fixing, runs mainly horizontally in the direction of the shaft wall. The spindle is rotatably and movably mounted in the primary fixing element, so that the spindle can be displaced in the direction of the shaft wall or away from the shaft wall by a corresponding rotation, for example by means of a hand crank. In particular, the spindle is displaced so far in the direction of the shaft wall that it already rests against the outside of the shaft wall before the movement of the bearing frame in the direction of the shaft.

In an embodiment of the invention, the primary fixing element has a fixing arm which can be arranged in a fixing position and a displacement position on the transport device. In its fixing position, the fixing arm allows the base frame to be fixed to the shaft opening, and in its displacement position, it allows the transport device to be displaced. In the displacement position, the fixing arm can thus be displaced together with the transport device and does not have to be transported separately. This allows a particularly effective use of the transport device.

The length of the fixing arm can be changed, in particular, so that it can be adapted to the corresponding shaft, in particular to the height of the shaft opening. In particular, it is designed in several parts, in particular in two parts, with the two parts being designed such that they can be moved into one another and separated from one another and can be fixed in a desired position relative to one another, for example with a bolt. In particular, the transport device is designed in such a way that all parts of the fixing arm can be arranged on it in a displacement position.

In an embodiment of the invention, at least part of the fixing arm is arranged on the base frame so as to be pivoted about a pivot axis and can be brought from the fixing position to the displacement position and vice versa by pivoting about the pivot axis. This allows a particularly simple operation of the transport device and also ensures that the part of the fixing arm that is pivotably and thus firmly connected to the base frame cannot get lost. In this case, the fixing arm is designed in particular in two parts.

In an embodiment of the invention, the fixing device has a secondary fixing element for support on an inside of the shaft wall having the shaft opening. A particularly secure fixation can thus be made possible and tilting of the transport device when moving the bearing frame relative to the base frame can be prevented in a particularly reliable manner.

In particular, the fixing device has two secondary fixing elements. During fixing, the secondary fixing element or the secondary fixing elements extend so far downwards, in particular in the vertical direction, that they protrude beyond the door opening and can thus be supported below the door opening on the inside of the shaft wall. When moving the bearing frame into the shaft, there is in particular a risk that the base frame and thus the transport device will tilt in the direction of the shaft. This can be reliably prevented with a support on the inside of the shaft wall having the shaft opening below the shaft opening. The secondary fixing element or the secondary fixing elements also prevent the base frame and thus the transport device from moving away from the shaft opening in the horizontal direction.

The fixing device can also be designed in a different way. It is conceivable, for example, that the fixing device fixes itself between the floor and a ceiling in front of the shaft opening.

In an embodiment of the invention, rollers are arranged on the base frame, by means of which rollers the base frame is supported on a floor below the base frame and which can roll on the floor. The transport device can thus be displaced particularly easily.

In particular, the transport device has four rollers. In particular, the rollers are arranged on the base frame so as to be pivoted about a vertical axis, and in particular they can be locked in different directions.

In an embodiment of the invention, a supporting device is arranged on the base frame in addition to the rollers mentioned, by means of which rollers the base frame can be supported on a floor in front of the shaft opening. In this way, the load on the rollers can be relieved when introducing the installation frame into the shaft. The supporting device has, in particular, two vertically aligned spindles which are rotatably and movably mounted in the base frame. By turning them accordingly, they can be screwed out of the base frame so far down that they are supported on the floor in front of the shaft opening and lift the base frame so far that at least the two wheels arranged in the direction of the shaft opening are no longer loaded or are even lifted from the ground.

In an embodiment of the invention, the base frame has a coupling device which is designed and arranged in such a way that a coupling to a drive device for displacing the transport device can be produced. The transport device can thus be displaced particularly easily. This allows the transport device to be used particularly easily. The coupling device can be designed, for example, as a metal profile in which a drive device can engage. The drive device can be designed, for example, like a drive device according to EP 1710146 A2.

Instead of a coupling device for a drive device, the transport device can also have driven rollers or a drive machine in the form of an electric motor.

In an embodiment of the invention, the bearing frame has a centering device by means of which the installation frame is guided into a predetermined fitting position when fitting on the bearing frame. On the one hand, this makes it possible for the installation frame to be fitted securely in the position provided for it on the bearing frame and, on the other hand, fitting is made easier.

In particular, the bearing frame has a plurality of centering devices, specifically four centering devices. The centering devices have, in particular, insertion bevels that interact with corresponding bevels on extensions of the installation frame. When fitting the installation frame on the bearing frame, the bevels can slide off one another and thus bring the installation frame into the specified fitting position.

In an embodiment of the invention, the centering device has a securing device by means of which an installation frame fitted on the bearing frame can be secured on the receiving frame. This can prevent the installation frame from being unintentionally detached from the bearing frame and thus from the transport device.

The securing device can, for example, have a recess, for example in the form of a through-hole which is aligned with a corresponding recess, for example in the form of a through-hole in the installation frame, in the specified fitting position of the installation frame. To secure the installation frame on the bearing frame, a securing pin can be inserted through the two recesses, for example, whereby a positive connection between the installation frame and the bearing frame is established. It is also possible that the securing device is not arranged on the centering device but at another location.

In particular, the transport device has at least one eyelet by means of which the transport device can be suspended. The transport device can thus be displaced particularly easily, for example by means of a crane.

In particular, the transport device has more than one eyelet, specifically four eyelets. The eyelet or eyelets are arranged in particular on the bearing frame, in particular welded on.

The aforementioned object is also achieved by a method for introducing the installation frame into a shaft, in particular an elevator shaft. The installation frame is fitted on a bearing frame of a mobile transport device and is supported from above on the bearing frame. The bearing frame is supported by a base frame of the transport device. The method according to the invention has at least the following steps fixing the base frame and thus the transport device by means of a fixing device arranged on the base frame at the shaft opening outside the shaft, whereby the transport device is prevented from tilting and moving the bearing frame, which is movably arranged in the horizontal direction relative to the base frame, from outside the shaft through the shaft opening into the shaft, whereby the installation frame is introduced from outside the shaft through the shaft opening into the shaft.

The method has the advantages mentioned in connection with the mobile transport device.

In particular, the steps are carried out in the specified order, but deviations from this order are also conceivable.

A fitting, in particular the first fitting of the installation frame on the bearing frame of the mobile transport device, can take place outside the building having the shaft. After the first fitting, the installation frame is fitted back on the bearing frame of the mobile transport device, is displaced to another shaft, and is introduced into the other shaft, in particular after completing installation work in one shaft.

After fitting, the included installation frame is displaced to a shaft opening of the shaft. This displacement can be within a building or between buildings. A wide variety of aids, such as a drive device, a forklift, a crane, or a truck, can be used for the displacement. The transport device can also be moved by hand by one or more installers and thus displaced.

Before or after introduction into the shaft, the installation frame is connected in particular to a suspension means running in the shaft. Thus, after introduction into the shaft, the installation frame can be lifted upward from the bearing frame by means of the suspension means by a displacement component arranged at the top of the shaft, for example in the form of a winch, and can be displaced in the shaft.

After the installation frame has been attached and lifted off, the bearing frame is in particular removed from the shaft again. For this purpose, it is moved horizontally relative to the base frame from inside the shaft to outside the shaft, i.e. in the direction of the base frame. The movement carried out when introducing the installation frame into the shaft is therefore carried out in the opposite direction.

The fixation to the shaft opening can subsequently be detached and the transport device can be displaced away from the shaft opening. In this way, the transport device does not interfere with subsequent installation work in the shaft.

After completion of the installation work in the shaft, the installation frame is removed from the shaft with the help of the mobile transport device, as already described above.

It should be noted that some of the possible features and advantages of the invention are described herein with reference to different embodiments of the transport device according to the invention and the method according to the invention. A person skilled in the art recognizes that the features can be combined, adapted, transferred, or exchanged in a suitable manner in order to arrive at further embodiments of the invention.

Further advantages, features, and details of the invention will become apparent from the following description of embodiments and from the drawings in which identical or functionally identical elements are denoted with identical reference signs. The drawings are merely schematic and are not to scale.

DETAILED DESCRIPTION

Figure 1:
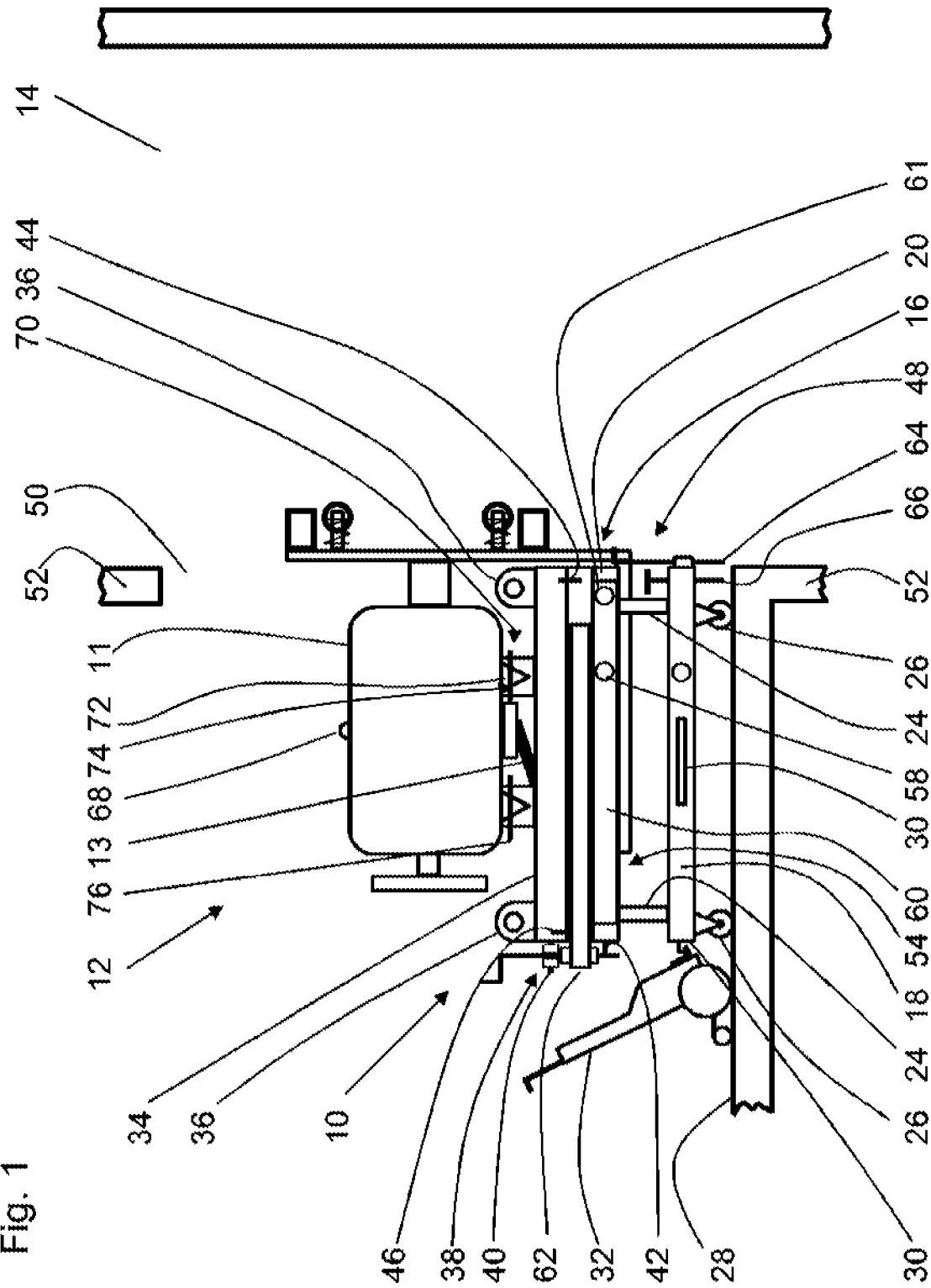
FIG. 1 shows a mobile transport device arranged in front of a shaft opening of a shaft with a fitted installation frame.

According to FIG. 1, a mobile transport device 10 for transporting an installation frame 11 of an installation device 12 and for introducing the installation frame 11 and the installation device 12 into a shaft in the form of an elevator shaft 14 has a base frame 16. The installation device 12 also has a mechatronic installation component in the form of an industrial robot 13 which is arranged hanging down on the installation frame 11.

The base frame 16 has a lower frame 18 and an upper frame 20. The two frames 18, 20 have an identical rectangular cross section and consist of rectangular metal profiles. The two frames 18, 20 are connected to one another via four vertically running bars 24, also made of metal profiles, of equal length, which bars are each arranged in the region of the corners of the frames 18, 20. The two frames 18, 20 of the base frame 16 are thus arranged parallel to one another. The base frame 16 thus has a cuboid basic shape. The two frames 18, 20 and the bars 24 thus form a basic structure of the base frame 16.

Arranged on the underside of the lower frame 18 of the base frame 16 are four rollers 26 via which the base frame 16 and thus the transport device 10 are supported on a floor 28 below the base frame 16. The rollers 26 are arranged pivotably about a vertical axis on the lower frame 18 and can be locked in different directions. The transport device 10 can thus be moved on the floor 28, with the rollers 26 rolling on the floor 28. On a total of three sides of the lower frame 18 of the base frame 16, coupling devices 30 are arranged in the form of metal profiles which are open at the bottom and into which a driven transport device 32 can engage and thus apply a driving force to the transport device 10. The drive device 32 can be designed, for example, like a drive device according to EP 1710146 A2.

The upper frame 20 of the base frame 16 supports a bearing frame 34 on which the installation frame 11 of the installation device 12 is supported from above. The bearing frame 34 is thus arranged horizontally and therefore not inclined relative to the horizontal. It also has a rectangular cross section and also consists of a rectangular metal profile. The cross section of the bearing frame 34 is identical to the cross sections of the two frames 18, 20 of the base frame 16. An eyelet 36 is arranged on the bearing frame 34 in the region of each of its four corners, by means of which eyelets the transport device 10 can be suspended and displaced on a suitable cable (not shown). The bearing frame 34 is connected to the upper frame 20 of the base frame 16 via two telescopic extension rails (17 in FIG. 2) which are arranged parallel to one another and cannot be seen in FIG. 1. The bearing frame 34 and the installation device 12 can thus be moved horizontally in the direction of the elevator shaft 14 relative to the base frame 16.

The movement of the bearing frame 34 relative to the base frame 16 takes place by means of a spindle drive 38. The spindle drive 38 has a spindle 40 which is rotatably mounted in an L-shaped add-on part 42 on the upper frame 20 of the base frame 16 and cannot be movably mounted in the horizontal direction. The spindle 40 is also connected to the bearing frame 34 in such a way that the bearing frame 34 is horizontally moved relative to the spindle 40 when the spindle 40 rotates. When the spindle 40 rotates, the bearing frame 34 is moved relative to the base frame 16. The spindle 40 can be turned and rotated with a hand crank (not shown). It is also possible that a hand drill (not shown) is coupled to the spindle 40 and it is turned or rotated with it.

A first stop 44 is arranged on the upper frame 20 of the base frame 16 at its end oriented in the direction of the elevator shaft 14. This first stop 44, together with a second stop 46, which second stop 46 arranged on an end of the bearing frame 34 facing away from the elevator shaft, delimits the horizontal movement of the bearing frame 34 relative to the base frame 16. The two stops 44, 46 come into contact with one another when a maximum movement is reached and thus prevent further displacement of the bearing frame 34 relative to the base frame 16 in the direction of the elevator shaft 14. This situation is shown in FIG. 2.

A fixing device 48 for fixing the base frame 16 to a shaft opening 50 of a shaft wall 52 of the elevator shaft 14 and for preventing the transport device 10 from tilting is also arranged on the base frame 16. FIG. 1 shows the fixing device 48 in its transport position in which it allows the displacement of the transport device 10. The fixing device 48 has two primary fixing elements 54 arranged laterally on the base frame 16, only one primary fixing element 54 being visible in FIGS. 1 and 2. The primary fixing element 54 has a two-part fixing arm (56 in FIG. 2) which consists of a lower arm part 60 which is pivotable about a pivot axis 58 fixedly arranged on the upper frame 20 of the base frame 16 and an upper arm part 62. The pivotable arm part 60 can be secured relative to the upper frame 20 of the base frame 16 with a bolt 61. The upper arm part 62 can be inserted into the lower arm part 60 and secured in various positions with a bolt (not shown). The length of the fixing arm 56 is thus adjustable and can be adapted to the height of the shaft opening 50. In its transport position, the upper arm part 62 is fastened to the upper frame 20 of the base frame 16 by means of a bracket (not shown).

The fixing device 48 also has a secondary fixing device in the form of two pins 64 which can be moved in the vertical direction and are arranged at the shaft-side end of the lower frame 18 of the base frame 16. Only one pin 64 can be seen in FIGS. 1 and 2. The pins 64 can be fixed at different heights by means of bolts (not shown). In FIG. 1, i.e. in the transport position of the fixing device 48, the pins 64 are arranged in such a way that they end above the floor 28 and thus do not impede a displacement of the transport device 10.

Figure 2:
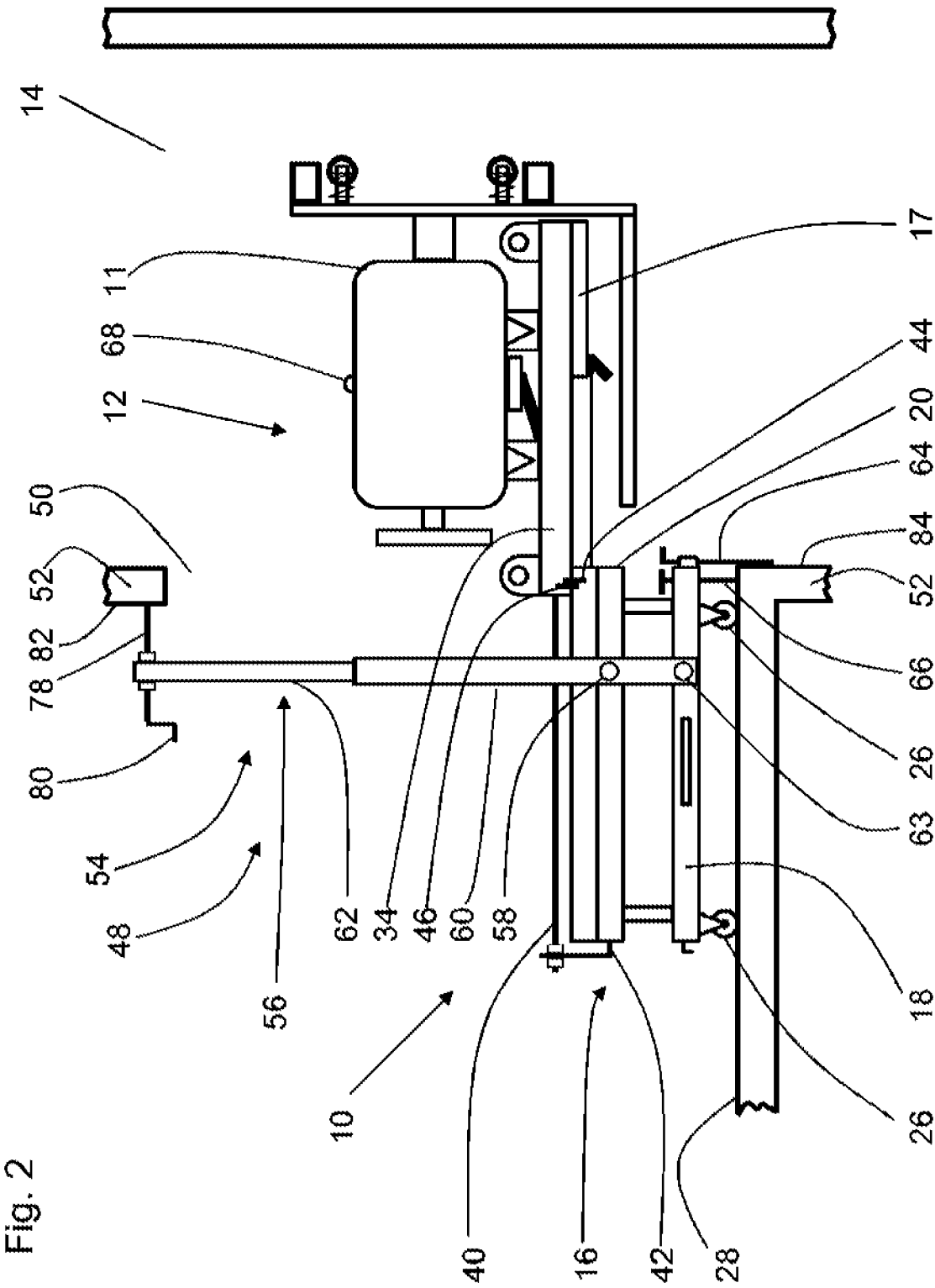
FIG. 2 shows the transport device from FIG. 1 in a state fixed to the shaft opening and the installation frame pushed into the shaft and FIG. 3 shows a mobile transport device arranged in front of a shaft opening of a shaft in an alternative embodiment with a fitted installation frame.

Two supporting devices in the form of two vertically aligned spindles 66 are arranged on the lower frame 18 of the base frame 16 in the region of the shaft-side end thereof, only one spindle 66 being visible in FIGS. 1 and 2. The spindles 66 can protrude further or less far down from the lower frame 18 by a corresponding rotation. In FIG. 1, the spindles 66 are arranged in such a way that they end above the floor 28 and thus do not impede a displacement of the transport device 10.

In order to introduce the installation device 12 with the installation frame 11 into the elevator shaft 14, the installation device 12 must be fitted on the bearing frame 34 of the transport device 10. A first fitting takes place outside of the building in which the elevator shaft 14 is arranged. The installation device 12 is fitted on the bearing frame 34 in particular by means of a crane. For this purpose, the installation device 12 can be suspended from an eyelet 68. The eyelet 68 is also used to suspend the installation device 12 from a suspension means (not shown) of a displacement component (not shown) in the form of a winch in the elevator shaft 14.

In order to bring the installation device 12 and thus the installation frame 11 into a predetermined fitting position, the bearing frame 34 has four centering devices 70, only two of which can be seen in FIGS. 1 and 2. The centering devices 70 have conically arranged insertion bevels which interact with corresponding bevels on downwardly oriented extensions 72 of the installation frame 11. When fitting the installation frame 11 on the bearing frame 34, the corresponding bevels slide off one another and bring the installation frame 11 into the specified fitting position shown in FIGS. 1 and 2.

The centering devices 70 each have a securing device 74 by means of which the installation frame 11 fitted on the bearing frame 34 can be secured on the frame 34. The securing device 74 has a through-hole (not shown) in the centering device, which through-hole is aligned with a corresponding through-hole (not shown) in the extension 72 of the installation frame 11 in the specified fitting position of the installation frame 11. To secure the installation frame 11 on the bearing frame 34, a securing pin 76 is inserted through the two through-holes, whereby a positive connection between the installation frame 11 and the bearing frame 34 is established.

The described fitting of the installation frame 11 on the bearing frame 34 can also take place after installation work in an elevator shaft has been completed. This is discussed in more detail below.

After fitting the installation frame 11 on the bearing frame 34, the transport device 10, including the installation frame 11, is displaced to the shaft opening 50 of the elevator shaft 14. The transport device 10 is positioned in front of the shaft opening 50 such that the vertical pins 64 of the secondary fixing device are arranged straight in the elevator shaft 14 and can be moved down over the floor 28. This position is shown in FIGS. 1 and 2.

In order to introduce the installation device 12 and thus the installation frame 11 into the elevator shaft 14, the fixing device 48 is brought into the fixing position thereof shown in FIG. 2, and the base frame 16 and the transport device 10 are thus fixed to the shaft opening 50. For this purpose, the upper arm parts 62 are removed from their brackets on the upper frame 20 of the base frame 16 and inserted into their associated lower arm parts 60. The length of the fixing arms 56 is adjusted in such a way that they protrude slightly beyond the shaft opening 50. The fixing arms 56 are subsequently pivoted upward about their pivot axes 58 into their fixing position and are secured in this position relative to the lower frame 18 of the base frame 16 by means of a bolt 63.

The fixing arms 56, specifically the upper arm parts 62, each have a spindle 78 at their upper end, which spindle runs horizontally in the direction of the shaft wall 52 when the fixing arms 56 are in the fixing position. The spindles 78 are rotatably and movably mounted in the fixing arms 56 so that the spindles can be displaced in the direction of the shaft wall 52 or away from the shaft wall 52 by a corresponding rotation by means of a hand crank 80. To fix the base frame 16 and thus the transport device 10 to the shaft opening 50, the spindles 78 are displaced so far in the direction of the shaft wall 52 that they rest against an outside 82 of the shaft wall 52 and are thus supported on the outside 82 of the shaft wall 52. Since, as described, the fixing arms 56 project upwards beyond the shaft opening 50, the spindles 78 and thus the fixing arms 56 are supported above the shaft opening 50 on the outside 82 of the shaft wall 52 having the shaft opening 50. This state is shown in FIG. 2.

In order to bring the fixing device 48 into its fixing position, the secondary fixing device in the form of the two pins 64 is also brought into its fixing position. For this purpose, the two pins 64 are pushed down far enough that they end below the floor 28. In their lower region, they therefore bear against an inner side 84 of the shaft wall 52 having the shaft opening 50 and can thus be supported on the inner side 84. Since the pins 64 end below the floor 28, the pins 64 are supported below the shaft opening 50 on the inside 84 of the shaft wall 52 having the shaft opening 50. This state is shown in FIG. 2.

In order to relieve the load on the rollers 26, in particular the two rollers 26 on the shaft side, when introducing the installation device 12 into the elevator shaft 14, the spindles 66 of the supporting device are rotated out of the lower frame 18 of the base frame 16 so far down that they are supported on the floor 28 and the two shaft-side rollers 26 are no longer loaded. This state is shown in FIG. 2.

After fixing the base frame 16 and the transport device 10 to the shaft opening 50, the securing pins 76 of the securing devices 74 are removed (see FIG. 1), so that the installation frame 11 and thus the installation device 12 can be lifted off the bearing frame 34.

Subsequently, by turning or rotating the spindle 40 of the spindle drive 38, the bearing frame 34 and thus the installation device 12 having the installation frame 11 are moved horizontally relative to the base frame 16 in the direction of the elevator shaft 14. The two telescopic extension rails 17 which connect the bearing frame 34 to the upper frame 20 of the base frame 16 are pulled apart. The bearing frame 34 is thus moved together with the installation device 12 and the installation frame 11 from outside the elevator shaft 14 through the shaft opening 50 into the elevator shaft 14. The displacement continues until the first stop 44 on the upper frame 20 of the base frame 16 comes into contact with the second stop 46 on the bearing frame 34, and the movement is thus terminated. This state is shown in FIG. 2.

After the movement into the elevator shaft 14 was terminated, the installation frame 11 and thus the installation device 12 are connected via the eyelet 68 to a suspension means (not shown) of a displacement component (not shown) in the form of a winch in the elevator shaft 14. The installation device 12 having the installation frame 11 is subsequently lifted off the bearing frame 34 with the winch and the suspension means.

The bearing frame 34 is subsequently moved back in the direction of the base frame 14 and the fixation device 48 on the shaft opening 50 is detached. The transport device 10 is thus brought back into the state shown in FIG. 1. Subsequently, the transport device 10 can be displaced away from the shaft opening 50.

The installation device 12 can subsequently carry out the necessary installation steps in the elevator shaft 14. After completion of the installation steps, the installation device 12 is removed from the elevator shaft 14 again by means of the transport device 10. For this purpose, it is brought back into the position shown in FIG. 2 and the installation device 12 is fitted back on the bearing frame 34 by means of the winch and the suspension means. The steps described in connection with the introduction of the installation device 12 are subsequently carried out in reverse order.

Figure 3:
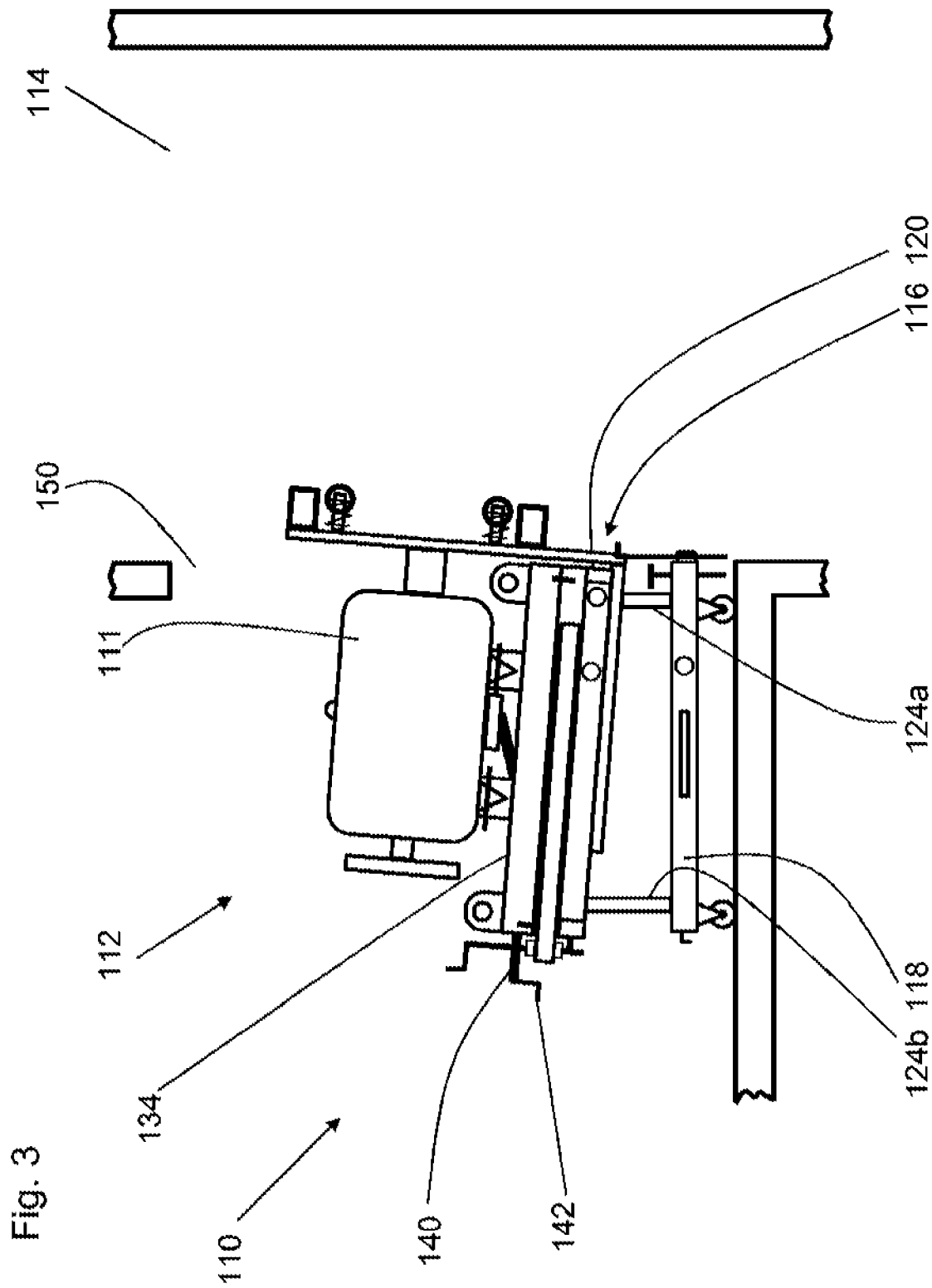

FIG. 3 shows an alternative embodiment of a transport device 110 with a fitted installation frame 111 in the same position in front of a shaft opening 150 of a shaft 114 as the transport device 10 in FIG. 1 in front of the shaft opening 50. Since the transport device 110 of FIG. 3 differs only slightly from the transport device 10 of FIG. 1, only the differences between the two transport devices will be discussed here.

The vertically running bars of the base frame 116 of the transport device 110, which bars connect the lower frame 118 to the upper frame 120, are not the same but have different lengths. The bars 124*a* facing the shaft opening 150 are shorter than the bars 124*b* facing away from the shaft opening 150, so that the upper frame 120 of the base frame 116 has an inclination in the direction of the shaft opening 150. The bearing frame 134 supported by the upper frame 120 of the base frame 116 therefore also has an inclination in the direction of the shaft opening 150.

A cable winch 140 is arranged on the upper frame 120 of the base frame 116 and can be actuated with a hand crank 142. A non-visible cable of the cable winch 140 is connected to the bearing frame 134. The cable winch 140 can be used to prevent or control the automatic movement of the bearing frame 134 relative to the base frame 116 caused by the inclination of the bearing frame 134. After the installation device 112 has been introduced into the shaft 114 and suspended on the cable of the displacement component, the bearing frame 134 can be pulled back out of the shaft 114 using the cable winch 140 and thus moved back in the direction of the base frame 116.

Finally, it should be noted that terms such as "having," "comprising," etc. do not preclude other elements or steps and terms such as "a" or "an" do not preclude a plurality. Furthermore, it should be noted that features or steps that have been described with reference to one of the above embodiments can also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A mobile transport device for transporting an installation frame and for introducing the installation frame into a shaft, the transport device comprising:
   a base frame;
   a fixing device arranged on the base frame for fixing the base frame to a shaft opening of a shaft wall of a shaft and for preventing the transport device from tilting relative to a horizontal direction;
   a bearing frame adapted to support the installation frame; and
   wherein the bearing frame is supported by the base frame and is movable in the horizontal direction relative to the base frame such that, when the base frame is arranged outside of the shaft, the bearing frame is movable into the shaft from outside the shaft through the shaft opening.

2. The transport device according to claim 1 wherein the bearing frame is arranged on the base frame via a telescopic extension rail.

3. The transport device according to claim 1 wherein the base frame and the bearing frame each include a stop arranged in such that the stops cooperate to delimit movement of the bearing frame relative to the base frame.

4. The transport device according to claim 1 wherein the bearing frame is movable to the base frame by a spindle drive.

5. The transport device according to claim 1 wherein the bearing frame is arranged inclined relative to the horizontal direction.

6. The transport device according to claim 1 wherein the fixing device has a primary fixing element adapted to support on an outside of the shaft wall at the shaft opening.

7. The transport device according to claim 6 wherein the primary fixing element has a fixing arm movable between a fixing position and a displacement position on the transport device, wherein, in the fixing position, the fixing arm enables the base frame to be fixed to the shaft opening and, in the displacement position, the fixing arm enables the transport device to be displaced.

8. The transport device according to claim 7 wherein that fixing arm has one part arranged on the base frame to pivot about a pivot axis and the one part is movable between the fixing position and the displacement position by pivoting about the pivot axis.

9. The transport device according to claim 1 wherein the fixing device has a secondary fixing element adapted to support on an inner side of the shaft wall at the shaft opening.

10. The transport device according to claim 1 including rollers arranged on the base frame, the rollers supporting the base frame on a floor and enabling the base frame to roll on the floor.

11. The transport device according to claim 10 including a supporting device arranged on the base frame and supporting the base frame on the floor in front of the shaft opening.

12. The transport device according to claim 1 wherein the base frame includes a coupling device adapted to couple to a drive device for displacing the transport device.

13. The transport device according to claim 1 wherein the bearing frame includes a centering device adapted to guide the installation frame into a predetermined fitting position when fitting on the bearing frame.

14. The transport device according to claim 13 wherein the centering device includes a securing device adapted to secure the installation frame fitted on the bearing frame to the bearing frame.

* * * * *